United States Patent
Pradeepkumar et al.

(10) Patent No.: US 12,451,745 B2
(45) Date of Patent: Oct. 21, 2025

(54) ELECTRIC MACHINE SLOT LINER WITH ENHANCED VARNISH CONTROL

(71) Applicant: FORD GLOBAL TECHNOLOGIES, LLC, Dearborn, MI (US)

(72) Inventors: Akash Changarankumarath Pradeepkumar, Westland, MI (US); Singar Rathnam, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 18/329,924

(22) Filed: Jun. 6, 2023

(65) Prior Publication Data

US 2024/0413693 A1 Dec. 12, 2024

(51) Int. Cl.
*H02K 3/34* (2006.01)

(52) U.S. Cl.
CPC .................... *H02K 3/345* (2013.01)

(58) Field of Classification Search
CPC .................... H02K 3/34; H02K 3/345
USPC ........................................... 310/215
See application file for complete search history.

(56) References Cited

U.S. PATENT DOCUMENTS

| | | | | |
|---|---|---|---|---|
| 8,575,814 B2 * | 11/2013 | Chamberlin | ............ | H02K 3/345 |
| | | | | 310/180 |
| 12,136,859 B2 * | 11/2024 | Hassanpour | ............. | H02K 1/24 |
| 2012/0235534 A1 * | 9/2012 | Chamberlin | ............ | H02K 3/345 |
| | | | | 310/215 |
| 2012/0238142 A1 * | 9/2012 | Chamberlin | ............ | H02K 3/345 |
| | | | | 29/596 |
| 2014/0117805 A1 | 5/2014 | Hagiwara et al. | | |
| 2014/0319959 A1 * | 10/2014 | Kaiser | ...................... | H02K 3/34 |
| | | | | 310/215 |
| 2017/0104380 A1 * | 4/2017 | Teachnor | ............... | H02K 3/345 |
| 2020/0381969 A1 * | 12/2020 | Ahmed | ................. | H02K 3/505 |
| 2022/0294299 A1 * | 9/2022 | Hisada | ................... | H02K 1/165 |
| 2022/0311290 A1 * | 9/2022 | Rathnam | ............... | H02K 1/276 |
| 2023/0054794 A1 * | 2/2023 | Fatemi | ................... | H02K 3/345 |

(Continued)

FOREIGN PATENT DOCUMENTS

CN 2686190 Y 3/2005

*Primary Examiner* — Rashad H Johnson
(74) *Attorney, Agent, or Firm* — David B Kelley; Brooks Kushman P.C.

(57) ABSTRACT

An electric machine includes a stator core having an outer circumferential surface, an inner circumferential surface, and longitudinal slots recessed into the inner circumferential surface. Each of the slots has first and second radial walls, an outboard circumferential wall extending between the radial walls, an entrance portion having opposing first and second angled walls extending divergently away from the inner circumferential surface, a first shoulder connecting the first radial wall to the first angled wall, and a second shoulder connecting the second radial wall to the second angled wall. Windings are disposed in the slots. Slot liners are also disposed in the slots such that the windings are disposed in an interior of the slot liners. At least one of the slot liners has first and second flaps angled towards each other from opposing sidewalls of the slot liner, wherein the first and second flaps cooperate to define an inner varnish dam, and the first flap, the second flap, and the corresponding one of the slots cooperate to define an outer varnish dam.

20 Claims, 4 Drawing Sheets

(56) References Cited

U.S. PATENT DOCUMENTS

2023/0163652 A1\* 5/2023 Rathnam ................ H02K 15/10
 310/215
2024/0250572 A1\* 7/2024 Zhang ...................... H02K 1/16

\* cited by examiner

ELECTRIC MACHINE SLOT LINER WITH ENHANCED VARNISH CONTROL

TECHNICAL FIELD

The present disclosure relates to electric machines and more specifically to electric machines that include slots liners having varnish-control features.

BACKGROUND

Vehicles such as fully electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator core having an outer circumferential surface, an inner circumferential surface, and longitudinal slots recessed into the inner circumferential surface. Each of the slots has first and second radial walls, an outboard circumferential wall extending between the radial walls, an entrance portion having opposing first and second angled walls extending divergently away from the inner circumferential surface, a first shoulder connecting the first radial wall to the first angled wall, and a second shoulder connecting the second radial wall to the second angled wall. Windings are disposed in the slots. Slot liners are also disposed in the slots such that the windings are disposed in an interior of the slot liners. At least one of the slot liners has first and second flaps angled towards each other from opposing sidewalls of the slot liner, wherein the first and second flaps cooperate to define an inner varnish dam, and the first flap, the second flap, and the corresponding one of the slots cooperate to define an outer varnish dam.

According to one embodiment, an electric machine includes a stator core having an outer circumferential surface, an inner circumferential surface, and longitudinal slots recessed into the inner circumferential surface. Each of the slots has first and second radial walls, an outboard circumferential wall extending between the radial walls, an entrance portion having opposing first and second angled walls extending divergently away from the inner circumferential surface, a first shoulder connecting the first radial wall to the first angled wall, and a second shoulder connecting the second radial wall to the second angled wall. Slot liners are disposed in the slots. At least one of the slot liners includes a pair of opposing sidewalls spaced apart in a circumferential direction of the core, an outer end wall extending between sidewalls and cooperating with the sidewalls to define an interior, a first flap extending from one of the sidewalls at an angle towards the inner circumferential surface and terminating at an edge that engages with the second angled wall, and a second flap extending from the other of the sidewalls at an angle towards the inner circumferential surface and terminating at an edge that engages with a surface of the first flap to close the interior. Windings disposed in the interior of the slot liners.

According to another embodiment, an electric machine includes a stator core having an outer circumferential surface, an inner circumferential surface, and longitudinal slots recessed into the inner circumferential surface, each of the slots including first and second radial walls, an outboard circumferential wall extending between the radial walls, and an entrance portion. Windings are disposed in the slots. Slot liners are disposed in the slots such that the windings are disposed in an interior of the slot liners. At least one of the slot liners has a pair of opposing sidewalls, a first flap extending from one of the sidewalls at an angle towards the inner circumferential surface and terminating at an edge that engages with a side of the slot, and a second flap extending from the other of the sidewalls at an angle towards the inner circumferential surface and terminating at an edge that engages with a surface of the first flap to close the interior.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
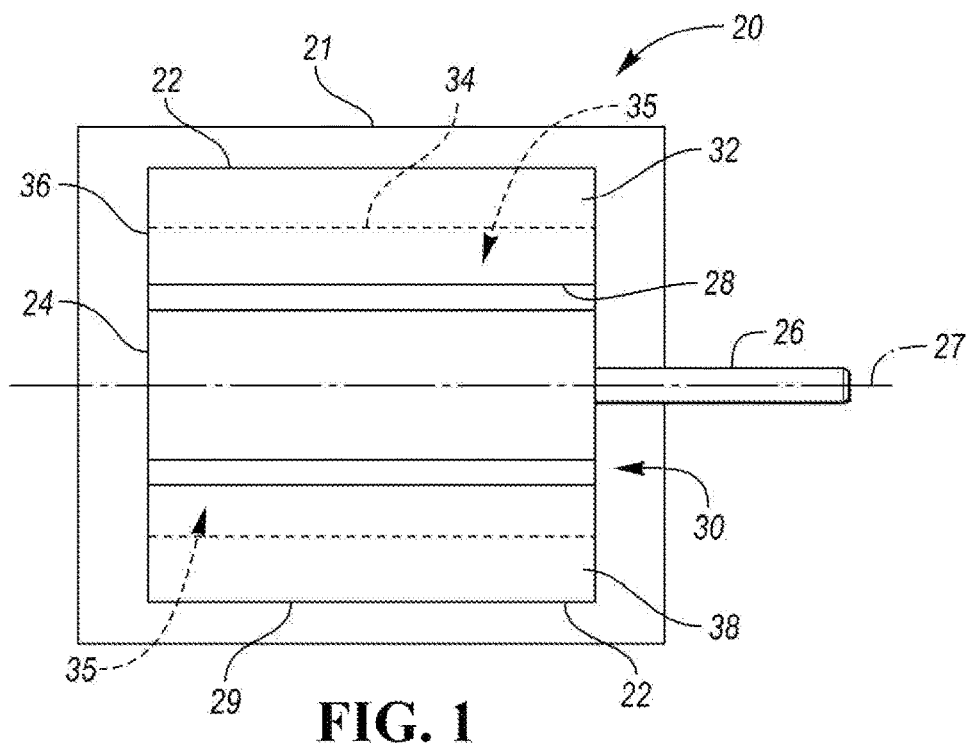
FIG. 1 is a schematic diagram of an electric machine.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a typical traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Directional terms used herein are made with reference to the views and orientations shown in the exemplary figures. A central axis is shown in one or more of the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Figure 2:
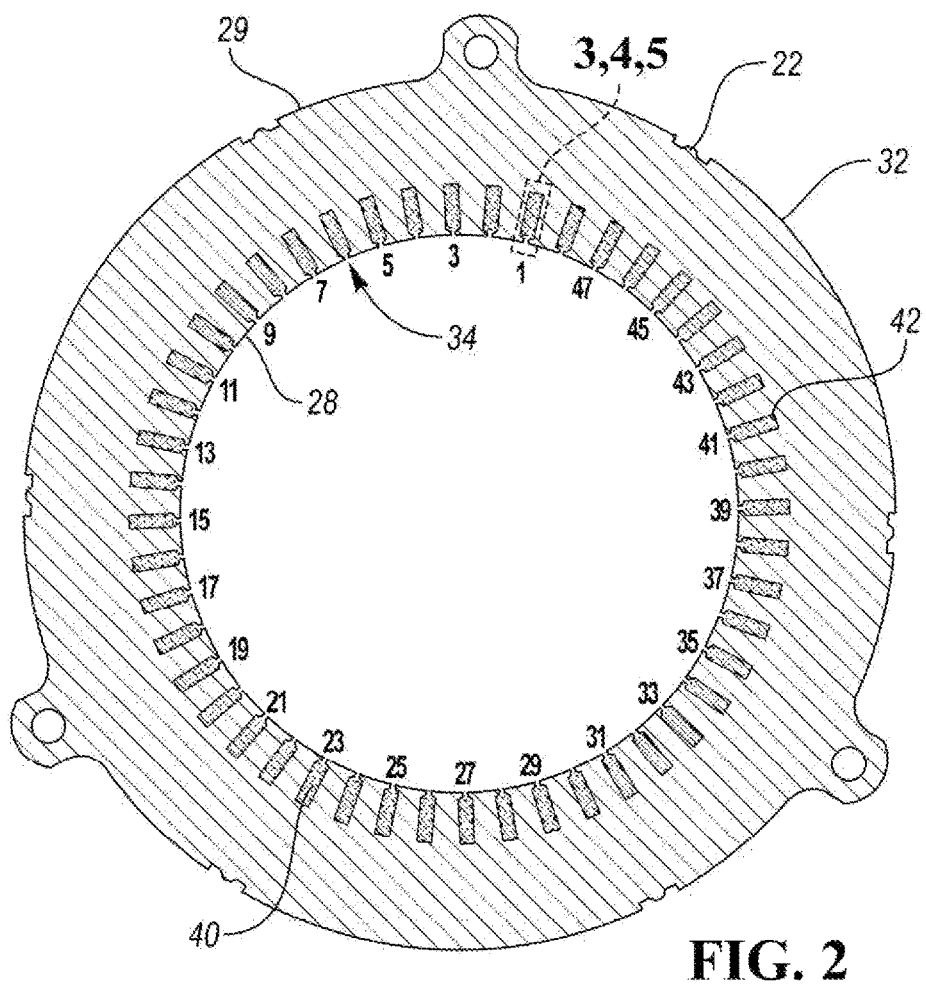
FIG. 2 is a cross-sectional end view of a stator of the electric machine.

Referring to FIGS. 1 and 2, the electric machine 20 includes a housing 21 that encloses the stator 22 and the rotor 24. The stator 22 is fixed to the housing 21 and includes a cylindrical core 32 having an inner circumferential surface or inner diameter (ID) that defines a hole 30, an outer circumferential surface or outer diameter (OD) 29, and windings 40. The core 32 may be formed from a plurality of stacked laminations. The rotor 24 is supported for rotation within the hole 30 about a central axis 27. The rotor 24 may include windings or permanent magnets that interact with windings of the stator 22 to generate rotation of the rotor 24 when the electric machine 20 is energized. The rotor 24 may be supported on a driveshaft 26 that extends through the housing 21 and is concentric with the central axis 27. The driveshaft 26 is configured to couple with a drivetrain of the vehicle.

The stator core 32 defines slots 34 circumferentially arranged around the core 32 and extending outward from the inner diameter 28. The slots 34 may be equally spaced around the circumference and extend axially from a first end 36 of the core 32 to a second end 38. In the illustrated embodiment, the core 32 defines forty-eight slots and has eight poles, but the core 32 may include more or fewer slots and/or poles in other embodiments. For example, the core 32 may define seventy-two slots and have twelve poles.

Slots liners 35 are received in the slots 34 with each slot having one liner 35 therein. The liners 35 provide electrical insulation between the stator core 32 and the windings 40. As will be described in more detail below, the liners 35 also include features for controlling the flow of varnish.

The windings 40 may be hairpin (as shown), distributed, or concentrated. In the example embodiment, the windings 40 comprise a plurality of interconnected hairpins 42. Hairpin windings are an emerging technology that enhance efficiency for electric machines used in vehicles and other applications. The hairpin windings 40 enhance efficiency by providing a greater amount of stator conductors to reduce resistance of the winding 40 without encroaching into space reserved for the electrical steel and the magnetic flux path. The hairpins are generally U-shaped with each bent to include a pair of legs joined by a crown. The hairpins 42 are installed in the stator core 32 by inserting the legs through corresponding ones of the slots 34. All of the hairpins may be installed from the same end of the stator core 32, e.g., end 36, so that all of the crowns are located on one end of the stator, e.g., end 36, and the ends of the legs are located on the other end, e.g., end 38. Once installed, the legs of the hairpins 42 are bent to form twists that connect with the twists of other hairpins. The ends of corresponding twists are joined by a connection such as a weld. The hairpins are typically made of bar conductors having a rectangular cross-section, but the hairpins may have a circular or other cross-sectional shape.

The windings 40 may include three phases. Each phase includes one or more paths. For example, each phase may include two parallel paths. The paths are formed by a plurality of interconnected pins 42, that once connected, form a continuous circuit. Each of the paths includes a first end that starts a terminal and a second end that ends at a neutral connection, e.g., a neutral bar.

Figure 3:
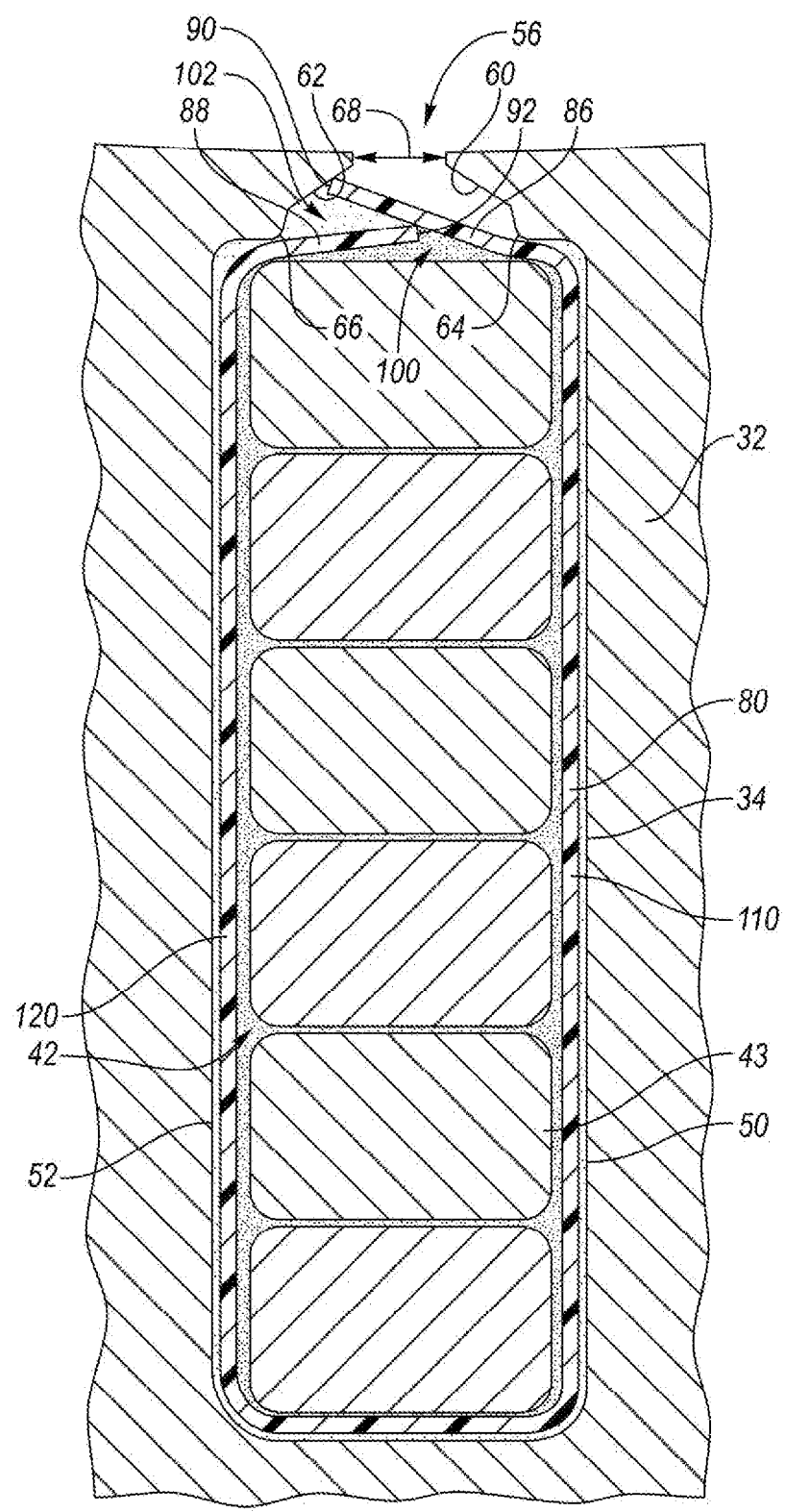
FIG. 3 is a detail view of the stator, post varnish, showing one of the slots, slot liners, and multiple conductors received therein.

Referring to FIGS. 2 and 3, each of the slots 34 may contain the legs 43 of six hairpins 42 disposed within an interior 48 of the liner 35, for example. Each of the slots 34 may include first and second radial walls, 50, 52, an outboard circumferential wall 54 extending between the radial walls, an entrance portion 56. The entrance portion 56 opens into the air gap (space between stator and rotor) at the inner diameter 28. The entrance portion 56 may have opposing first and second angled walls 60, 62 extending divergently away from the inner circumferential surface (ID) 28, a first shoulder 64 connecting the first radial wall 50 to the first angled wall 60, and a second shoulder 66 connecting the second radial wall 52 to the second angled wall 62. The angled walls terminate at the ID 28 with a gap or opening 68 defined therebetween. The above-described walls, shoulders, etc. may extend continuously along the entire length of the stator core 32.

The slot liner 35 may include a pair of opposing sidewalls 80, 82 are spaced apart in the circumferential direction of the core 32. An outer end wall 84 extends between the sidewalls 80, 82 and cooperates with the sidewalls to define the interior 48. A first flap 86 extends from the sidewall 80 at an angle towards the inner circumferential surface 28 and terminates at an edge 90 that engages with the second angled wall 62. A second flap 88 extends from the sidewall 82 at an angle towards the inner circumferential surface 28 and terminates at an edge 92 that engages with a surface 94 of the first flap 86 to close the interior 48. The above-described walls and flaps may be internally formed portions of the liner 35. The liner 35 may have a constant cross-sectional shape along its entire length with the above-described walls and flaps extending longitudinally between opposing ends of the liner 35.

The stator is varnished following complete assembly to increase structural rigidity, enhance thermal conduction, and provide electrical insulation. The varnish may be applied by a drip—the machine that has drip nozzles. The nozzles may be placed near the end windings and apply varnish at the conductor/liner interface and the liner/slot interface to achieve the desired in-slot varnish fill. In order to enhance retention of the varnish within the slot liner interior 48, and within the gap between the slot and the liner, and prevent the flow varnish into the air gap, varnish dams are provided.

For example, the flaps 86 and 88 cooperate with each other and the stator core to define varnish dams configured to inhibit the flow of varnish. In the example of FIG. 3, the first and second flaps 86, 88 cooperate to define an inner varnish dam 100, and the first flap, the second flap, and the slot cooperate to define an outer varnish dam 102. The inner varnish dam 100 traps varnish within the interior 48 of the slot liner 35, whereas the outer varnish dam 102 traps varnish within the slot 34 and mitigates the flow varnish into the air gap. The shoulders 64, 66 also engage with liner 35 and/or flaps 86, 88 to inhibit the flow of varnish from the void space between the slot 34 and the liner 35 towards the air gap.

The first flap 86 defines a first angle with the sidewall 80, and the second flap defines a second angle with the sidewall 82. The second angle may be greater than the first angle so that the first flap 86 engages with the stator core 32 and the second flap 88 engages with the first flap 86. However, in other embodiments, this may be flipped. The first flap 86 may also be wider than the second flap 88.

Figure 4:
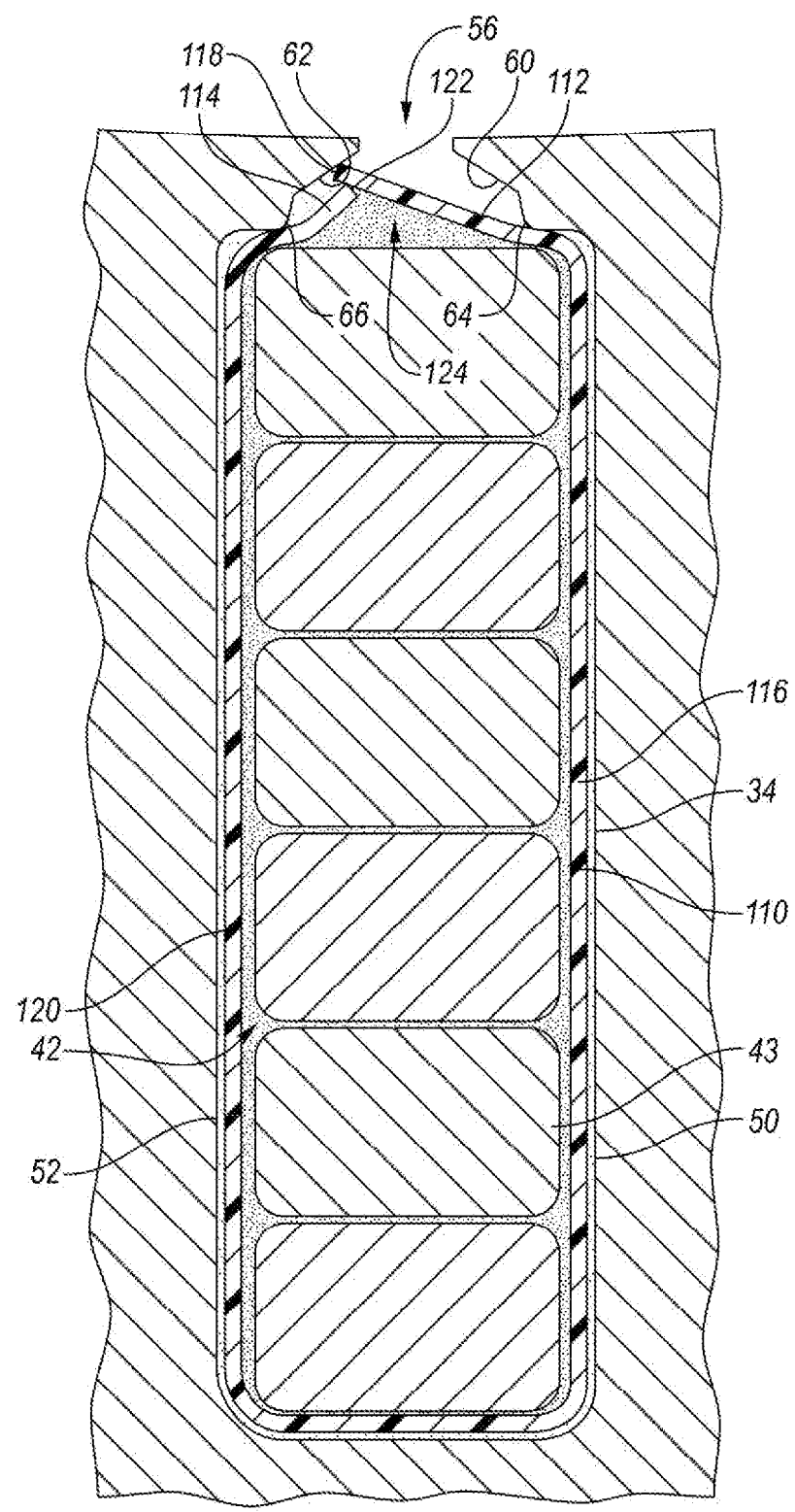
FIG. 4 is a detail view of the stator according to another embodiment.
Figure 5:
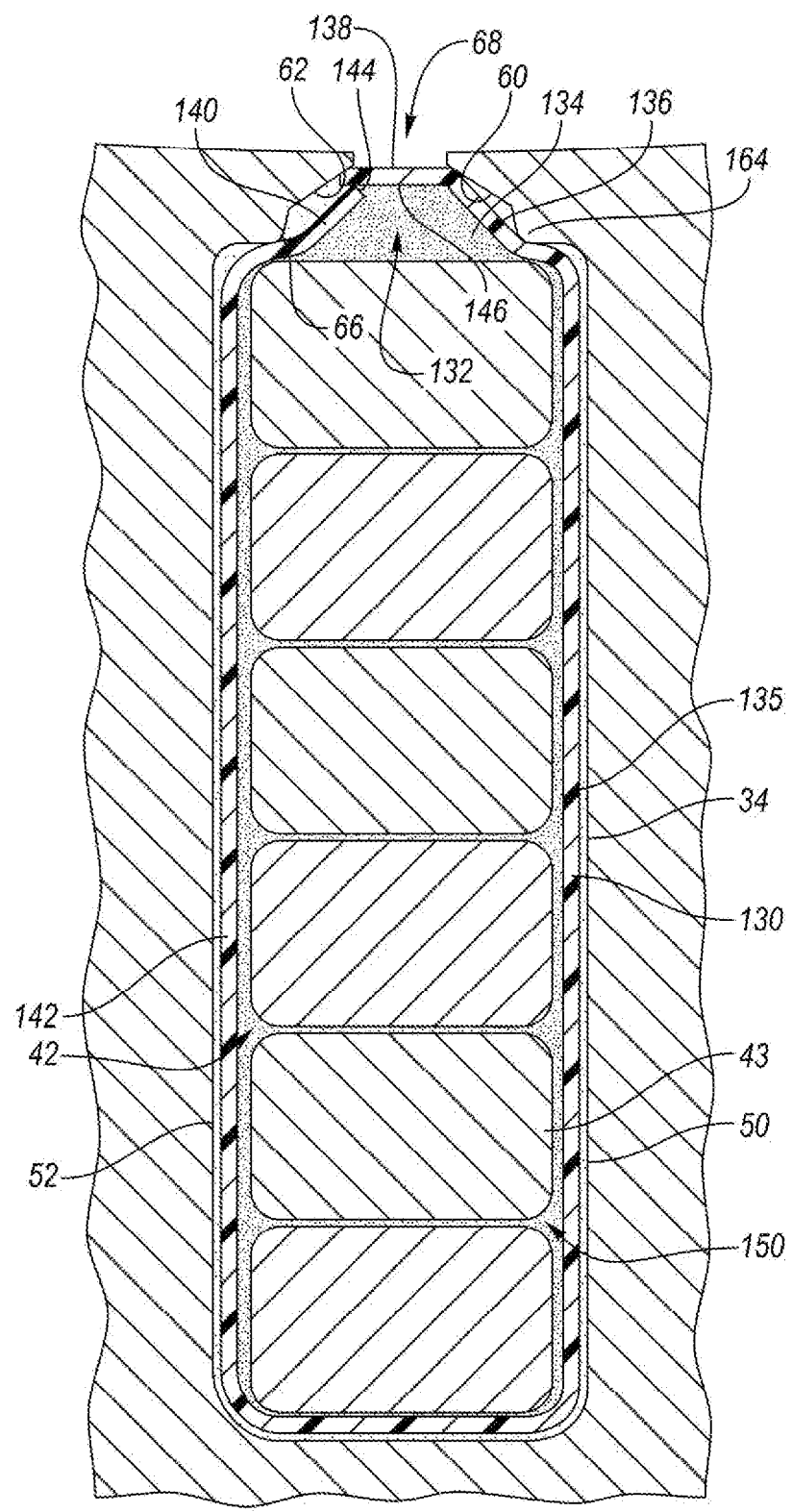
FIG. 5 is a detail view of the stator according to yet another embodiment.

The embodiment of FIG. 3 is but one example of a slot liner cooperating with a slot to define varnish dams. FIGS. 4 and 5 described alternative embodiments for the slot liner. In these figures, common components will maintain their reference numerals and may not be discussed again for brevity, FIG. 4 illustrates another liner 110 having a first flap 112 and the second flap 114. The first flap extends from the sidewall 116 as a tip 118 that engages with the angled wall 62 of the slot 34. Similar FIG. 4, the second flap 114 extends from the sidewall 120 of the liner and has a tip 122 that engages with a surface of the first flap 112. The angle of the flaps in this embodiment are increased to increase the size of the inner dam 124. The first flap 112 is still wider than the second flap, but the angle of the second flap 114 relative to the wall 120 is greater than the angle between the flap 112 and the wall 116 to provide the larger inner dam 124. The size of the outer dam 126 is reduced compared to FIG. 3.

FIG. 5 illustrates another liner 130 having even larger inner dam 132. In this embodiment, the first flap 134 extends from the sidewall 135 and the first angle forming a first segment 136 and then extends circumferentially to form a second segment 138. The second segment 138 the entrance or opening 68 of the slot 34. The first segment 136 may contact the slot 34 at the shoulder 64 and near the entrance 68. The second segment 138 includes an end portion that engages with the angle sidewall 62. A second flap 140 extends from the sidewall 142 and an angle similar to that of embodiment of FIG. 4. An edge 144 of the flap 140 engages with the second segment 138, e.g., surface 146, to close the interior 150 of the slot liner 130.

The above-described varnish dams inhibit the flow varnish to unwanted areas while retaining the varnish within desired areas. This results in more uniform varnish cover within the slots and slot liners while reducing or eliminating varnish flow within the air gap between the stator and the rotor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
   a stator core having an outer circumferential surface, an inner circumferential surface, and longitudinal slots recessed into the inner circumferential surface, each of the slots including first and second radial walls, an outboard circumferential wall extending between the radial walls, an entrance portion having opposing first and second angled walls extending divergently away from the inner circumferential surface, a first shoulder connecting the first radial wall to the first angled wall, and a second shoulder connecting the second radial wall to the second angled wall;
   windings disposed in the slots; and
   slot liners disposed in the slots such that the windings are disposed in an interior of the slot liners, at least one of the slot liners having first and second flaps angled towards each other from opposing sidewalls of the slot liner, wherein the first and second flaps cooperate to define an inner varnish dam, and the first flap, the second flap, and the corresponding one of the slots cooperate to define an outer varnish dam.

2. The electric machine of claim 1, wherein the first flap is wider than the second flap.

3. The electric machine of claim 1, wherein the first flap defines a first angle with a first of the opposing sidewalls and the second flap defines a second angle with a second of the opposing sidewalls, wherein the second angle is greater than the first angle.

4. The electric machine of claim 3, wherein the first flap is wider than the second flap.

5. The electric machine of claim 1, wherein the first flap has an edge in contact with a surface of the slot.

6. The electric machine of claim 5, wherein the second flap has an edge in contact with a surface of the first flap.

7. The electric machine of claim 1, wherein the windings comprise a plurality of interconnected hairpins.

8. An electric machine comprising:
   a stator core having an outer circumferential surface, an inner circumferential surface, and longitudinal slots recessed into the inner circumferential surface, each of the slots including first and second radial walls, an outboard circumferential wall extending between the radial walls, an entrance portion having opposing first and second angled walls extending divergently away from the inner circumferential surface, a first shoulder connecting the first radial wall to the first angled wall, and a second shoulder connecting the second radial wall to the second angled wall;

slot liners disposed in the slots, at least one of the slot liners including:
- a pair of opposing sidewalls spaced apart in a circumferential direction of the core,
- an outer end wall extending between sidewalls and cooperating with the sidewalls to define an interior,
- a first flap extending from one of the sidewalls at an angle towards the inner circumferential surface and terminating at an edge that engages with the second angled wall, and
- a second flap extending from the other of the sidewalls at an angle towards the inner circumferential surface and terminating at an edge that engages with a surface of the first flap to close the interior; and windings disposed in the interior of the slot liners.

9. The electric machine of claim 8, wherein the first flap, the second flap, and the second angled wall cooperate to define an outer varnish dam.

10. The electric machine of claim 8, wherein the first flap and the second flap cooperate to define an inner varnish dam located within the interior.

11. The electric machine of claim 8, wherein a surface of first flap is disposed against the first shoulder to inhibit varnish flow.

12. The electric machine of claim 11, wherein a surface of second flap is disposed against the second shoulder to inhibit the varnish flow.

13. The electric machine of claim 8, wherein the first flap is wider than the second flap.

14. The electric machine of claim 8, wherein the first flap includes a portion engaging with the first angled wall.

15. The electric machine of claim 14, wherein the first flap includes another portion engaging with the first shoulder.

16. The electric machine claim 8 further comprising a rotor supported for rotation within the stator core.

17. An electric machine comprising:
- a stator core having an outer circumferential surface, an inner circumferential surface, and longitudinal slots recessed into the inner circumferential surface, each of the slots including first and second radial walls, an outboard circumferential wall extending between the radial walls, and an entrance portion;

windings disposed in the slots; and slot liners disposed in the slots such that the windings are disposed in an interior of the slot liners, at least one of the slot liners including:
- a pair of opposing sidewalls,
- a first flap extending from one of the sidewalls at an angle towards the inner circumferential surface and terminating at an edge that engages with a side of the slot, and
- a second flap extending from the other of the sidewalls at an angle towards the inner circumferential surface and terminating at an edge that engages with a surface of the first flap to close the interior.

18. The electric machine of claim 17, wherein the first flap, the second flap, and a third wall of the slot cooperate to define an outer varnish dam.

19. The electric machine of claim 18, wherein the first flap and the second flap cooperate to define an inner varnish dam located within the interior.

20. The electric machine of claim 17, wherein first flap is wider than the second flap.

* * * * *